United States Patent [19]

Maze et al.

[11] Patent Number: 5,369,428
[45] Date of Patent: Nov. 29, 1994

[54] BIDIRECTIONAL INK JET PRINTING

[75] Inventors: Robert C. Maze; Kenneth E. Trueba, both of Corvallis, Oreg.

[73] Assignee: Hewlett-Packard Corporation, Palo Alto, Calif.

[21] Appl. No.: 898,872

[22] Filed: Jun. 15, 1992

[51] Int. Cl.$^5$ ................................ B41J 2/07
[52] U.S. Cl. .......................... 347/5; 347/37; 395/101; 400/323
[58] Field of Search .......... 395/101, 105, 108; 346/1.1, 140 R; 400/323; 347/5, 9, 12, 37

[56] References Cited

U.S. PATENT DOCUMENTS 4,969,758  1/1990  Sanders, Jr. et al. ............ 400/124

FOREIGN PATENT DOCUMENTS 2-14167  1/1990  Japan ................................ 395/108

Primary Examiner—Benjamin R. Fuller
Assistant Examiner—John Barlow

[57] ABSTRACT

Ink jet print quality is improved and higher pen speed permitted by a bidirectional printing protocol. According to the new protocol, each individual character to be printed is first partitioned into a leading portion and a trailing portion. The trailing portion includes all trailing edge bits. Only the leading portion is printed on a forward pass of the ink jet pen. The trailing portion is printed on a reverse pass of the pen, so that trailing edge ink drops are instead printed as leading edge ink drops. As a result, satellite ink drops are directed toward the center of the character, where they are covered by primary ink drops, thereby minimizing character edge roughness associated with exposed satellite ink drops.

11 Claims, 4 Drawing Sheets

BIDIRECTIONAL INK JET PRINTING

BACKGROUND OF THE INVENTION

This application pertains to the field of liquid ink printing systems such as ink jet printers, and in particular, to methods and apparatus for improving the quality of a printed product produced by an ink jet printer by reducing printed edge roughness.

Thermal ink jet print heads, commonly called "pens", print by expelling drops of a liquid printing solution such as ink onto a planar substrate such as paper or transparency material. The pen, mounted on a carriage, is transported horizontally across the paper surface, spaced just slightly apart from the surface. Vertical positioning is achieved by moving the paper up or down on the platen. Through a combination of moving the pen and paper, ink drops are deposited onto the paper in a predetermined pattern so as to form a desired image which may include characters and/or graphics.

In such a system, the ink is expelled from the pen by explosively boiling it, while the pen travels across the surface of the paper. These drops or jets of ink break up into a primary drop and several trailing "satellite" drops as they travel from the pen to the paper. Printed characters, for example, are formed by the main drops. The trailing satellites, for the most part, are covered by main drops. However, satellite ink drops which are not covered by main drops, such as satellites along a trailing edge of a printed character, can adversely affect the print quality. These "exposed" satellite ink drops, i.e. those not covered by primary ink drops, appear as roughness along some edges of the printed character. What is needed is a practical way to improve print quality by minimizing edge roughness.

Edge roughness resulting from ink satellites also is a function of the speed at which the pen travels across the surface of the paper. It is exacerbated by increased pen speed. Therefore, decreased print quality must be traded off against increased printing speed. What is needed is a way to allow increased pen speeds, with resulting increased printing speeds, without degrading print quality in terms of edge roughness.

SUMMARY OF THE INVENTION

One object of the present invention is to improve print quality in ink jet printing.

Another object of the invention is to improve character edge quality in ink jet printed characters, by reducing trailing edge roughness.

A further object of the invention is to transform conventional bit map character data into forward and reverse bit planes of data, for bidirectional printing in an ink jet printing system.

The invention includes a method of printing a character on a substrate so as to minimize exposed satellite ink drops along the edges of the character. The new method includes partitioning the character so as to form a leading portion and a trailing portion. The leading portion includes all leading edges of the character, while the trailing portion includes all trailing edges of the character. During printing, the pen is first moved in a forward direction. While the pen is moving forward, only the leading portion of the character is printed, so that satellite ink drops are directed toward the center of the character. Next, the pen is moved in a reverse direction opposite the forward direction. While the pen is moving in the reverse direction, the trailing portion of the character is printed in the same location (character cell) as the leading edge was printed, so that satellite ink drops again are directed toward the center of the character, thereby minimizing exposed satellite ink drops along the edges of the printed character.

Another aspect of the invention is directed to processing bit map character or graphics data for bidirectional printing as described. A character or graphic may be represented as data in a source file bit map, each bit in the bit map corresponding to a an image pixel. A 1-bit in the bit map, for example, may represent a primary drop of ink to be printed on the substrate at the corresponding pixel location. The invention further includes the steps of: identifying trailing edge bits in the bit map; while moving the pen in a forward direction, printing a first pattern of primary ink drops corresponding to the bit map except for the trailing edge bits; and, while moving the pen in the reverse direction, overprinting the first pattern with a second pattern of primary ink drops corresponding to the trailing edge bits. By following this procedure, primary ink drops corresponding to trailing edge bits in the source file bit map are instead applied to the paper as leading edge ink drops. The effect is to minimize exposed satellite ink drops and therefore allow increased pen travel speed.

A further aspect of the invention is to provide forward and reverse bit planes of memory for forming and storing data to control bidirectional printing. The forward and reverse bit planes have the same dimensions as the source file bit map, there being a one-to-one correspondence between them. The data may be formed as follows:

(1) copy the source file bit map into the forward bit plane as forward bit plane data;
(2) identify all trailing edge 1-bits in the forward bit plane data;
(3) clear the trailing edge bits in the forward bit plane; and
(4) set the corresponding bits in the reverse bit plane to form reverse bit plane data (other reverse bit plane bits being cleared). The forward bit plane data is printed while the pen moves in the forward direction, and the reverse bit plane data is printed while the pen moves in the reverse direction. An advantage of the invention is that trailing edge bits in the bit map (with respect to the forward direction of pen travel) are not printed on the forward pass of the pen, and instead are printed as leading edge bits while printing in the reverse direction. Consequently, satellite ink drops are not exposed, and printed edge quality improved.

The concepts described herein are applicable to printing individual characters, whole rows (lines) of text, pages of text or graphics, or indeed any collection of character or graphics data where improved print quality is desired. Clean printed edges, i.e. edges substantially free of exposed satellite ink drops, are desirable in all kinds of printed materials. Moreover, the concept disclosed may be applied to color ink jet printing although it is illustrated herein in the context of monochrome printing. The increase in pen travel speed permitted by the present invention may be expected to compensate, at least partially, for the printing speed penalty exacted by the two-pass printing method.

The foregoing and other objects, features and advantages of the invention will become more readily apparent from the following detailed description of a preferred embodiment which proceeds with reference to the drawings.

DETAILED DESCRIPTION OF THE PREFERRED EMBODIMENT

Figure 1A:
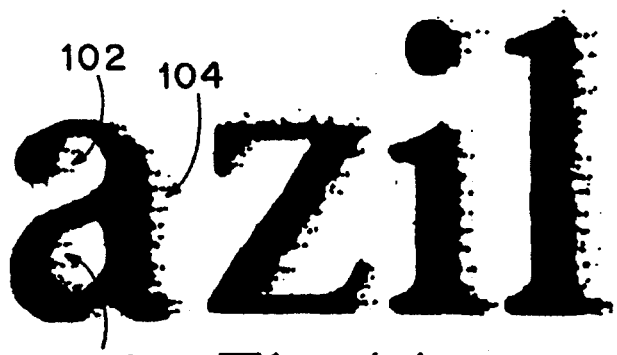
FIGS. 1A and 1B show ink jet print samples to illustrate trailing edge roughness associated with trailing edge satellite ink drops. (The edge roughness shown is a feature of the drawing.)
Figure 1B:

FIGS. 1A and 1B show ink jet print samples to illustrate trailing edge roughness associated with trailing edge satellite ink drops. The print 1A was printed by an ink jet print head moving from left to right in a unidirectional method of printing, as is known. Since the print head is moving from left to right, the left edge of a character is referred to as the leading edge, as it is printed first. Conversely, the right edge may be referred to as the trailing edge. As noted in the Background section, because of the nature of thermal ink print heads, the ink expelled onto the paper breaks up into a primary drop and several trailing satellite ink drops as the jets travel from pen to paper. Momentum imparted by the moving pen to the ink drops drives the drops in the direction of pen travel (in addition to the expulsion force driving the drops toward the paper).

Leading edge satellite ink drops generally are covered by subsequently printed ink drops. However, trailing edge satellite ink drops generally are exposed, leading to roughness along the trailing edge of the character. This is apparent along the right edge of all four characters in FIG. 1A.

Note also that a character (or graphic) may have more than one trailing edge. Every printed edge, i.e. every printed area (ink) that extends alongside a white space, may be defined as either a leading edge or a trailing edge. (An exception to this definition is a horizontal edge.) The lower-case letter "a" as shown in FIG. 1A has several trailing edges. These are identified as trailing edges 102, 104 and 106. FIG. 1B is a second print sample comprising the printed letters "the". This sample was printed with the print head travelling from right to left, again in a unidirectional printing mode. Accordingly, trailing edge roughness associated with satellite ink drops is apparent along the left edges of these characters. It may be noted that the leading edges of the characters, here the right edges, are relatively clean, i.e., substantially free of exposed satellite ink drops.

Figure 2:
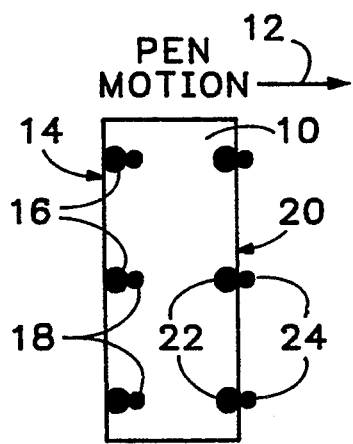
FIG. 2 illustrates a nominal character cell showing covered and exposed satellite ink drops typical of the prior art unidirectional printing.

FIG. 2 illustrates diagrammatically the problem which is manifested as character edge roughness in the print samples of FIG. 1. FIG. 2 shows a nominal character cell indicated by box 10. This cell defines an area within which a predetermined character is to be printed. Pen direction of travel in this diagram is indicated by the pen motion arrow 12, i.e., the pen travels from left to right. Character cell 10 thus includes a leading edge 14. Primary ink drops 16 are applied inside the character cell 10 along leading edge 14. These primary ink drops are accompanied by satellite ink drops 18 which fall slightly further into the cell. The satellite ink drops 18 typically are covered by additional ink drops subsequently applied to the paper as the pen moves from left to right.

Character cell 10 also includes a right edge 20 which in this case is the trailing edge. Primary ink drops 22 applied within the cell along the right or trailing edge 20 result in associated satellite ink drops 24. Satellite ink drops 24 fall outside the character cell 10 and are not covered by subsequently applied primary drops. These "exposed" satellite ink drops result in the trailing edge roughness described in connection with FIG. 1 above.

Figure 3:
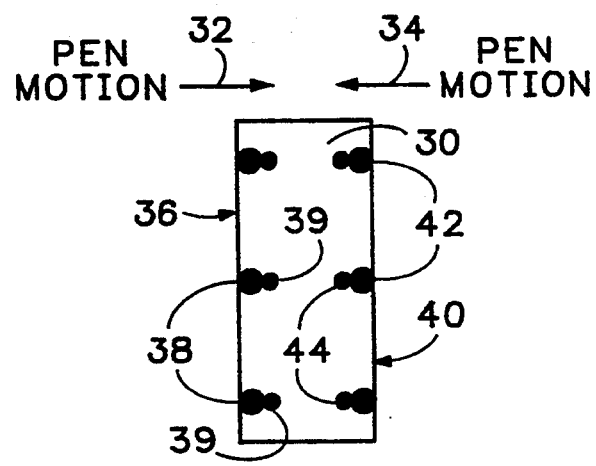
FIG. 3 illustrates a nominal character cell showing covered satellite ink drops associated with bidirectional printing according to the present invention.

FIG. 3 illustrates the effect of a bi-directional printing according to the present invention. FIG. 3 shows a nominal character cell 30 as in FIG. 2. Character cell 30 includes a left edge 36. Primary ink drops 38 are printed within the character cell 30 along the left edge 36 while the print head moves from left to right as indicated by the pen motion arrow 32. Accordingly, primary ink drops 38 are leading edge ink drops, which result in covered satellite ink drops 39 as discussed above with respect to FIG. 2.

Character cell 30 also includes a right edge 40. Primary ink drops 42 are printed within character cell 30 along the right edge 40 while the pen moves from right to left as indicated by pen motion arrow 34. Thus, primary ink drops 42 are also leading edge ink drops in the context of bi-directional printing. Satellite ink drops 44 associated with primary ink drops 42 fall within the character cell 30, because the pen is moving from right to left when they are printed. As a result, satellite ink drops 44 tend to be covered by subsequently printed ink drops. Satellite ink drops 44 are not exposed outside character cell 30. An advantage of the bi-directional printing approach is to minimize exposed satellite ink drops.

Although FIG. 3 illustrates the bi-directional printing concept in the context of a single character cell, this concept is readily extended to multiple characters and multiple lines of characters without limit. In general, the new method calls for partitioning a character to be printed so as to form a leading portion and a trailing portion of the character. The pen is moved in a predetermined forward direction, and while the pen is moving forward, the leading portion of the character, which includes the leading edge of the character is printed. However, the portion that would include a trailing edge is not printed during the forward "pass". Next, the pen is moved in a reverse direction i.e., opposite to the forward direction. While the pen is moving in the reverse direction, the trailing portion of the character, which includes the trailing edge of the character, is printed. The "trailing edge" thus is printed as a leading edge on the reverse pass.

Although the bi-directional printing method may be carried out with respect to individual characters, it is advantageous to complete the printing of an entire line before reversing the direction of travel of the print head. Formation of bi-directional print data is explained below. According to the invention, data which would be printed as trailing edge data in a prior art uni-directional printing system, instead is printed as leading edge data while the pen is moving in the reverse direction.

Figure 4:
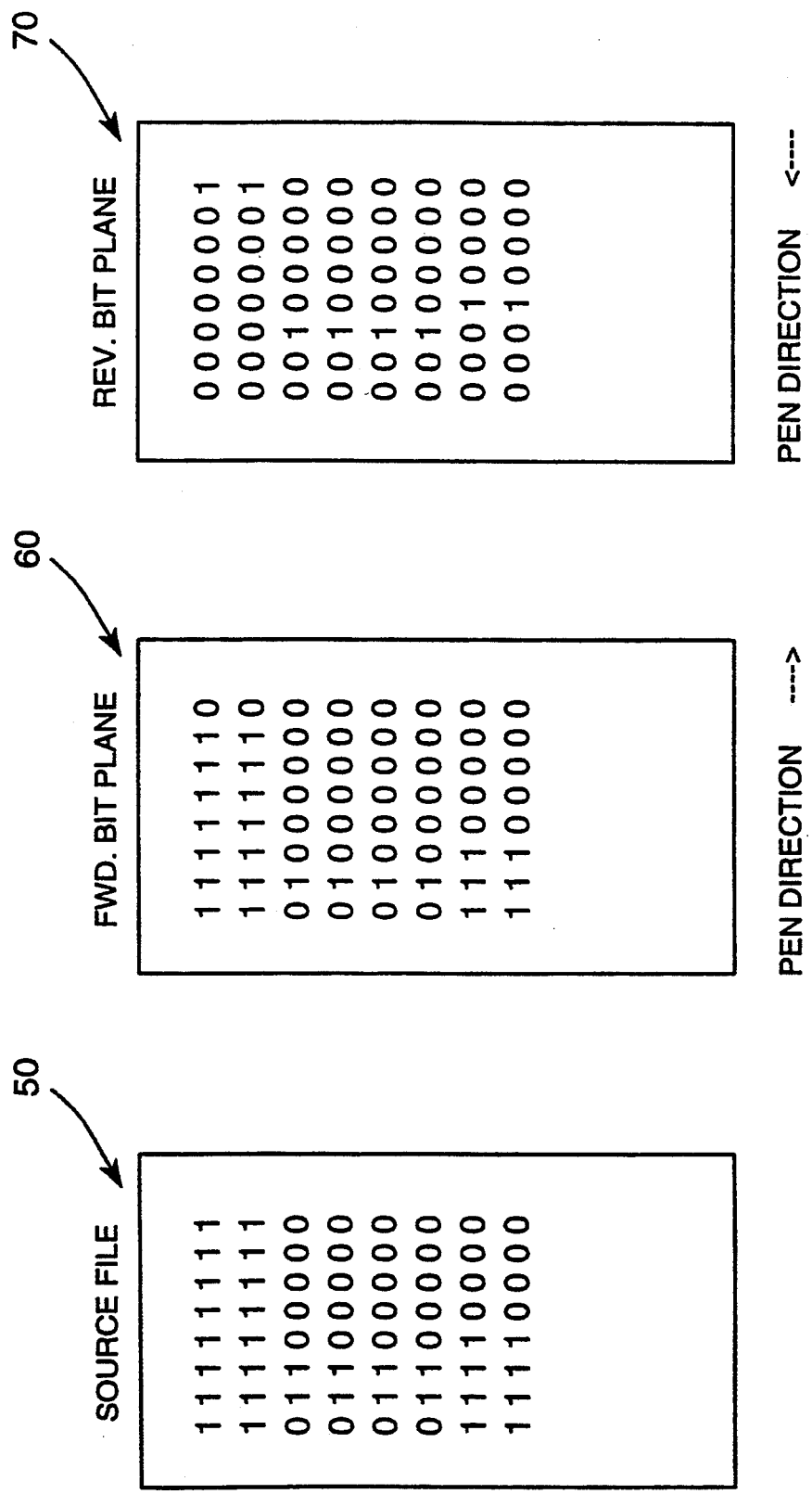
FIG. 4 illustrates ink jet print data stored in a source file, and the same data transformed into forward bit plane data and reverse bit plane data for bidirectional printing.

FIG. 4 illustrates ink jet print data stored in a source file, and shows how that data is transformed so as to form forward bit plane data and reverse bit plane data for bi-directional printing. Referring now to FIG. 4, a source file 50 contains a predetermined bit map for printing a character, as is known in the prior art. A 1-bit corresponds to a drop of ink to be printed, while a 0-bit identifies a pixel that is white or not printed. For example, where a print head comprises a vertical column of ink jet nozzles, lateral motion of the print head along, for example 8 ink drop locations or pixels, defines a nominal character cell. An ink jet pen may include 8, 16, 24 or more nozzles, typically arranged in a linear, vertical array. Since the source file of FIG. 4 comprises 8 bytes or rows of data, it conveniently may be printed with a pen that is at least 8 nozzles high. Or, for example, using a pen 24 nozzles high, three rows of such data may be printed simultaneously.

The source file bit map data must be partitioned into two parts for bi-directional printing; a first pattern to be printed while the pen moves in a forward direction, and a second pattern to be printed while the pen moves in the reverse direction. The pattern of bits to be printed in the forward direction is stored in a forward bit plane of memory 60. Similarly, a pattern of bits to be printed while the pen travels in the reverse direction is stored in a reverse bit plane of memory 70. Each bit plane includes a corresponding bit for each bit in the source file bit map. The second pattern is printed in the same location on the paper as the first pattern, i.e. overprinted. However, the data is non-overlapping in that, for each bit, at most only one of the corresponding bits in the forward and reverse bit planes is set. The bit plane data are formed such that what would be trailing edge ink drops, if printed on the forward pass, are suppressed and instead are printed while the pen moves in the reverse direction. Consequently, such ink drops are printed as leading edge ink drops.

Each row of data in the source file 50, comprising 8 bits, will be referred to as a byte of data. Source file 50 thus consists of 8 bytes. The forward bit plane 60 and reverse bit plane 70 have the same dimensions as the source file bit map. Any convenient array size may be used. The array size in practice will depend upon the pen itself and other characteristics of the printing system hardware and software.

In the source file bit map 50, it may be seen that the first two bytes (starting at the top) consist of all 1-bits. Since the pen direction associated with the source file bit map is left to right, the right edge 1-bits of the source file would be printed as trailing edge ink drops. However, in the forward bit plane data 60, the right-most 1-bits in the first two bytes are cleared to inhibit printing these pixels on the forward pass.

The reverse bit plane 70 shows the right-most bits set (1-bits) in the first two bytes, while the remaining bits within the first two bytes are zeros. The reverse bit plane controls printing while the pen travels in the reverse direction, indicated by the arrow below the reverse bit plane. Since the right-most bits are turned on in these first two bytes, and the pen travels from right to left, these bits will be printed as leading edge ink drops during the reverse pass.

The next four bytes of the source file bit map 50 show 1-bits in the second and third columns. The corresponding four bytes in the forward bit plane 60 show the same data, except that the right-most 1-bit is cleared in each byte. In the reverse bit plane 70, bits corresponding to the 1-bits which were cleared in the forward bit plane are set for printing the corresponding ink drops as leading edge ink drops while the pen travels in the reverse direction.

The last two bytes of the source file bit map 50 show 1-bits in the first four positions or columns. In the forward bit plane 60, the right-most 1-bits in each of these two bytes again is cleared. And finally, bits corresponding to the 1-bits which were cleared in the forward bit plane are turned ON in the reverse bit plane for printing in the reverse direction. The resulting pattern of primary ink drops resulting from bi-directional printing, i.e., the sum of the forward and reverse bit planes, is equal to the source file bit map. However, partitioning the bit map and printing bi-directionally in the manner described has the advantage of minimizing exposed satellite ink drops.

Figure 5:
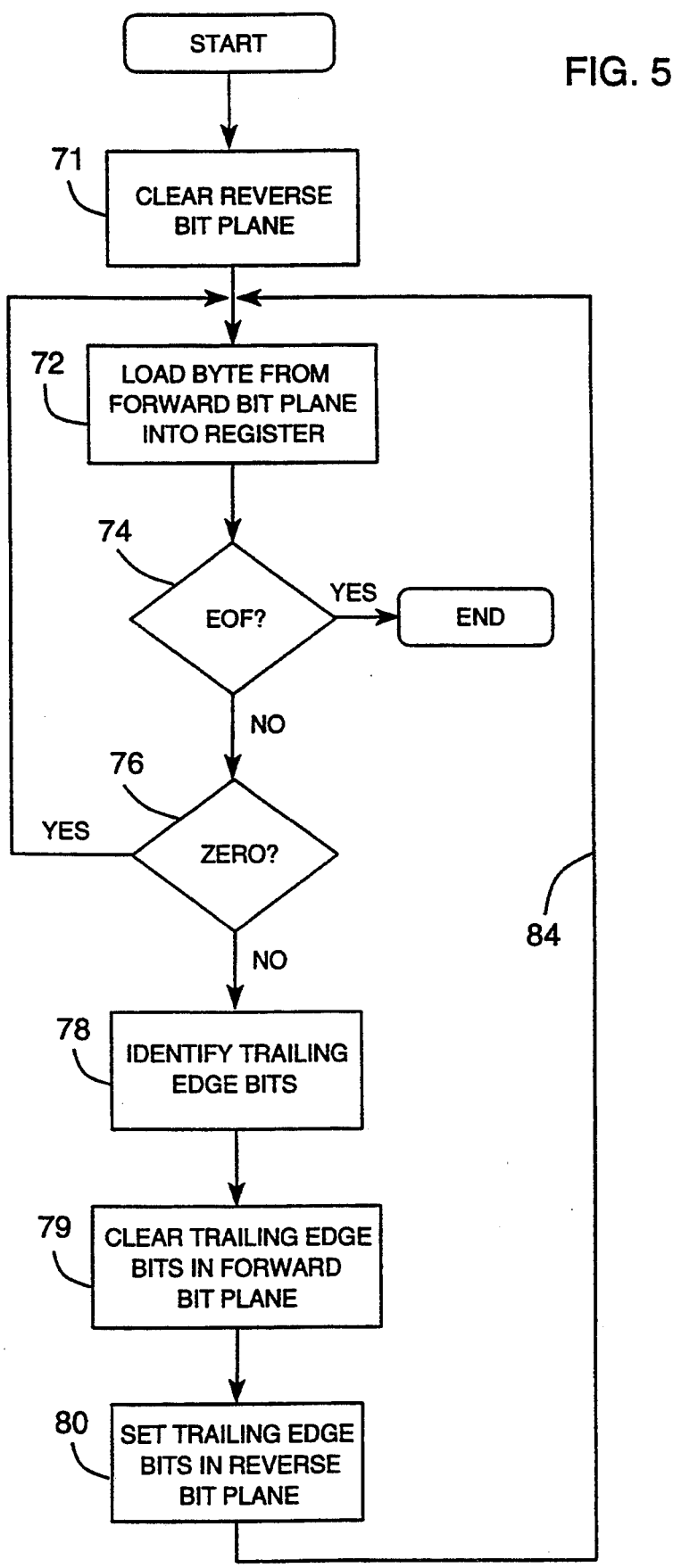
FIG. 5 is a flow chart of an illustrative method of forming reverse bit plane data from forward bit plane data so that trailing edge bits in the forward data are instead printed as leading edge bits in the reverse data.

Forming the forward and reverse bit plane printing data may be accomplished as follows. To begin, the source file bit map may simply be copied into the forward bit plane. Next, the forward bit plane data is modified and the reverse bit plane data is formed as illustrated in the flow chart of FIG. 5, described next. The method of FIG. 5 begins by clearing the reverse bit plane 71, i.e. writing zeros to all locations. The next step is loading a first byte of data 72 (the "current byte") from the forward bit plane into a register or suitable memory space. Test 74 examines whether the end of file has been reached and, if so, the process is complete and ends.

If the end of file is not encountered, test 76 examines the current byte to determine whether it consists of all 0-bits. If the current byte is all zeros, it necessarily has no trailing edge bits and, therefore, neither the current byte nor the corresponding byte in the reverse bit plane need be modified. Control loops back to load the next byte 72 from the forward bit plane for examination.

If the current byte is not all zeros, all trailing edge bits are identified 78. This may be done in various ways; for example, parsing though the byte or using a lookup table. A "trailing edge bit" is a 1-bit that either has an adjacent 0-bit to the right or is itself the right-most bit in the byte. Functionally, a trailing edge bit is one which will not have a primary ink drop printed next to it in the direction of pen travel. Next, the trailing edge bit(s) are cleared 79 in the forward bit plane (current byte). The trailing edge bits are set 80 in the corresponding byte in the reverse bit plane for printing on the reverse pass. In this way, bits cleared in the forward bit plane are set in the reverse bit plane. A convenient way to form the reverse bit plane data is to subtract the forward bit plane data from the source file bit map.

Next control loops 84 back to the loading step 72 to load the next byte from the forward bit plane. This process is repeated until end of file is detected 74. The concept illustrated by this flow chart may of course be implemented in a wide variety of software and/or hardware methods, as will be apparent to those skilled in the art in view of this disclosure. In many cases, a software implementation will be preferred because of lower cost.

Figure 6:
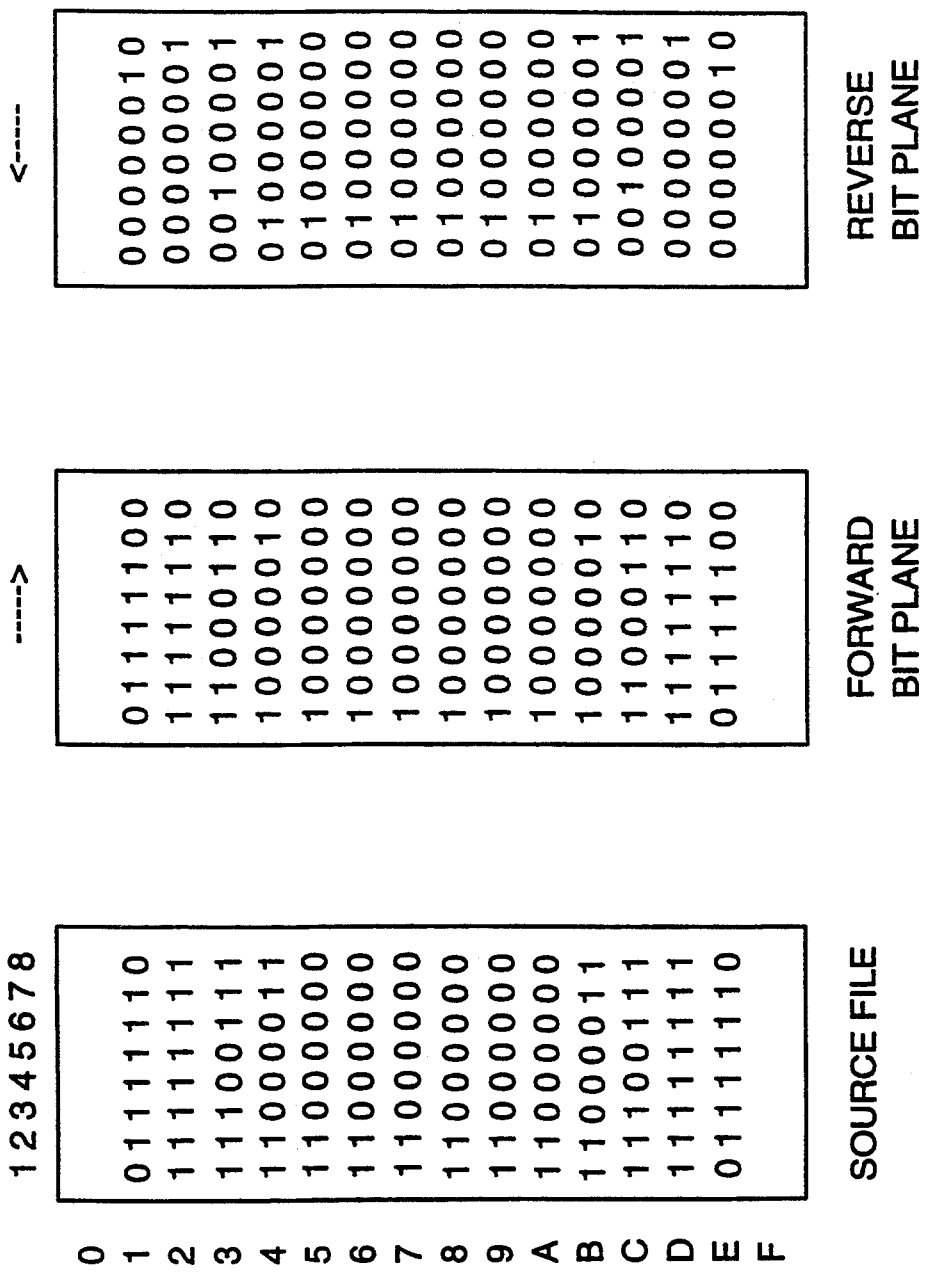
FIG. 6 illustrates ink jet print data for forming the letter "C" stored in a source file, and the same data transformed into forward bit plane data and reverse bit plane data for bidirectional printing.

Each byte in a source file bit map may have more than one trailing edge bit. To illustrate, refer to FIG. 6, in which a source file bit map contains a pattern of bits for printing the letter C. Here, the source file columns are numbered 1 through 8, and the rows or bytes are numbered 0 through F (hex). Individual bits are referred to by {row, column} address. The same addressing applies to the forward and reverse bit planes of FIG. 6.

In byte #3 of the source file, for example, both bits {3,3} and {3,8} are trailing edge bits. That is, there is a 0-bit or the end of the byte immediately to the right of each of these bits. To inhibit printing these trailing edge bits on the forward pass, corresponding bits {3,3} and {3,8} in the forward bit plane are cleared. And, corresponding bits {3,3} and {3,8} in the reverse bit plane are set, so that these pixels are printed on the reverse pass (as leading edge drops of ink). Multiple trailing edge bits also appear in the source file bit map within bytes #4, B and C. Every trailing edge bit is cleared in the forward bit plane and set in the reverse bit plane. Therefore, step 78 in the flowchart of FIG. 5 must identify every trailing edge bit.

Identifying trailing edge bits in a bit map may be done in a variety of ways. One convenient and fast way to do so is to provide a lookup table, using a source file byte as a pointer into the table. The lookup table may contain, for each possible source file byte, corresponding forward and reverse bit plane print data. Clearing the trailing edge 1-bits in the forward bit plane, as well as setting the corresponding bits in the reverse bit plane, thus may be done by overwriting the bit plane data with the corresponding lookup table data. A lookup table implementation would streamline the process illustrated by the flow chart of FIG. 5.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

We claim:

1. A method of printing a character on a substrate so as to minimize exposed satellite ink drops along edges of the printed character, comprising the steps of:
   partitioning the character so as to form a leading portion and a trailing portion with respect to a predetermined forward direction, the leading portion including a leading edge of the character and the trailing portion including a trailing edge of the character;
   moving a pen in the forward direction;
   while the pen is moving forward and at a first location, printing only the leading portion of the character so that satellite ink drops are directed toward a center of the character;
   moving the pen in a reverse direction opposite the forward direction; and
   while the pen is moving in the reverse direction and at the first location, printing the trailing portion of the character so that satellite ink drops are directed toward a center of the character, thereby minimizing exposed satellite ink drops along the edges of the printed character.

2. A method according to claim 1 further comprising:
   providing a predetermined source file bit map defining the character, each 1-bit in the bit map designating a primary drop of ink to be printed; and
   identifying trailing edge 1-bits in the bit map; and wherein: said printing the leading portion of the character includes printing a first pattern of primary ink drops corresponding to the bit map except for the trailing edge 1-bits; and
   said printing the trailing portion of the character includes overprinting the first pattern with a second pattern of primary ink drops corresponding to the trailing edge 1-bits, so that primary ink drops corresponding to the trailing edge 1-bits in the bit map are instead applied to the substrate as leading edge ink drops while the pen is moving in the reverse direction.

3. A method according to claim 2 further comprising:
   (a) providing a forward bit plane of memory for forming and storing forward bit plane data to control said printing the first pattern, the forward bit plane including a bit position corresponding to each bit position in the source file bit map;
   (b) providing a reverse bit plane of memory for forming and storing reverse bit plane data to control said printing the second pattern, the reverse bit plane including a bit position corresponding to each bit position in the forward bit plane;
   (c) copying the source file bit map into the forward bit plane;
   (d) identifying all trailing edge 1-bits in the forward bit plane;
   (e) clearing the trailing edge 1-bits in the forward bit plane; and
   (f) for each trailing 1-bit cleared in the forward bit plane, setting the corresponding bit position in the reverse bit plane; whereby the trailing edge 1-bits appear as leading edge 1-bits in the reverse bit plane data, and therefore are printed as leading edge ink drops while the pen is moving in the reverse direction.

4. A method according to claim 2 further comprising:
   partitioning the source file bit map to form a series of bytes, each byte consisting of a predetermined number of bits corresponding to pixels along a horizontal line on the substrate;
   providing a forward bit plane of memory for forming and storing forward bit plane data to control said printing the first pattern, the forward bit plane including a series of bytes corresponding to the source file bit map series of bytes;
   providing a reverse bit plane of memory for forming and storing reverse bit plane data to control said printing the second pattern, the reverse bit plane including a series of bytes corresponding to the forward bit plane series of bytes;
   copying the source file bit map data into the forward bit plane as forward bit plane data; and,
   as to each byte in the forward bit plane data, clearing the trailing edge 1-bits and setting the corresponding bits in the corresponding byte in the reverse bit plane to form the reverse bit plane data.

5. A method according to claim 4 further comprising providing a predetermined lookup table, the lookup table including, for each possible bit map byte, a corresponding table byte of forward bit plane data in which the trailing edge 1-bit is cleared; and wherein said clearing the trailing edge 1-bit includes overwriting the forward bit plane byte with the corresponding table byte from the lookup table.

6. A method according to claim 5 wherein:
the lookup table further includes, for each possible bit map byte, a second corresponding table byte of reverse bit plane data in which only the trailing edge 1-bits are set; and wherein said setting the corresponding bits includes overwriting the corresponding reverse bit plane byte with the corresponding second table byte from the lookup table.

7. A method according to claim 2 wherein said identifying trailing edge 1-bits includes:
(a) providing a forward bit plane of memory for forming and storing forward bit plane data to control said printing the first pattern;
(b) providing a reverse bit plane of memory for forming and storing reverse bit plane data to control said printing the second pattern;
(c) providing a predetermined lookup table containing forward and reverse bit plane data; and
(d) accessing the forward and reverse bit plane data in the lookup table data by using the source file bit map data to point to corresponding locations in the lookup table.

8. An ink jet printer comprising:
an ink jet pen for controllably expelling drops of ink onto a substrate to form a printed image;
bi-directional means for controllably transporting the pen along a horizontal print line relative to the substrate to allow bi-directional printing;
input means for receiving an indication of a selected character to be printed;
means for partitioning the selected character to form a first portion and a second portion, the first portion of the character including a leading edge With respect to a printing direction and the second portion of the character including a trailing edge with respect to a printing direction; and
means for controlling the transporting means and the pen to print only the first portion of the character on a forward pass of the pen and to print the second portion of the character in the same location on a reverse pass of the pen, whereby the trailing edge of the character is printed as a leading edge on the reverse pass to minimize exposed satellite ink drops.

9. An ink jet printer according to claim 8 further comprising:
memory means for storing a source file bit map defining a predetermined pattern of ink drops for forming the selected character on the substrate; and wherein
said means for partitioning the character includes means for partitioning the source file bit map data to form forward print data representing the first portion of the character and reverse print data representing the second portion of the character.

10. An ink jet printer according to claim 9 further comprising:
a forward bit plane memory for storing the forward print data to control printing the first portion of the character while the pen traverses the substrate in a predetermined forward direction, and
a reverse bit plane memory for storing the reverse print data to control printing the second portion of the character while the pen traverses the substrate in a reverse direction opposite to the forward direction and along the same horizontal print line, the reverse bit plane memory including a bit location corresponding to each bit location in the forward bit plane memory.

11. An ink jet printer according to claim 9 further comprising:
means for identifying the trailing edge bits in the forward print data;
means for clearing the trailing edge bits in the forward print data; and
means for setting the trailing edge bits in the reverse print data.

* * * * *